United States Patent [19]
Hughart et al.

[11] Patent Number: 5,324,555
[45] Date of Patent: Jun. 28, 1994

[54] PACKAGING FILMS

[75] Inventors: Jeffrey S. Hughart, Chicago, Ill.; Joel D. Finnell, Cleveland, Tenn.

[73] Assignee: Rexene Products Company, Dallas, Tex.

[21] Appl. No.: 897,814

[22] Filed: Jun. 12, 1992

[51] Int. Cl.⁵ .................................. B65B 53/00
[52] U.S. Cl. ..................... 428/34.9; 428/349; 428/516; 428/520; 428/522
[58] Field of Search ................ 428/349, 34.9, 516

[56] References Cited
U.S. PATENT DOCUMENTS 4,859,514  8/1989  Friedrich ..................... 428/349
5,093,164  3/1992  Bauer et al. ................. 428/349

Primary Examiner—Edith Buffalow
Attorney, Agent, or Firm—Harold E. Meier

[57] ABSTRACT

A lidstock film adapted to form a peelable seal with a substrate upon heat sealing comprises, a first layer of high density polyethylene, a second layer of ethylene vinyl acetate, and a third seal layer of a blend of a polyionomer and a low density polyethylene is disclosed. Also disclosed is a forming web adapted to form a peelable seal with a lidstock upon heat sealing, the forming web comprising a first seal layer of a mixture of a rubber and ethylene vinyl acetate, a second layer of a mixture of ethylene vinyl acetate and a linear low density polyethylene, and a third layer comprising linear low density polyethylene. The lidstock film and forming web are heat sealable at temperatures between 250° F. and 350° F. to form packages with peelable seals.

22 Claims, 1 Drawing Sheet

PACKAGING FILMS

TECHNICAL FIELD

This invention relates to a novel coextruded films adapted for use in form, fill and seal packaging operations and packages manufactured from such films.

BACKGROUND OF THE INVENTION

Form, fill and seal (FFS) packaging technology is widely used to package a broad variety of products including disposable medical devices, food stuffs and similar products. In one type of FFS packaging, materials corresponding to a lidstock for packages and a bottom or forming web are supplied in rolls. The forming web material is indexed from the roll into a heating zone where it is heated to forming temperatures. The heated forming web material is then either immediately formed or indexed into a forming station area where multiple box or cup shaped compartments are formed from the forming web using any one of a number of thermoforming techniques including drape forming, matched mold forming, vacuum forming or pressure bubble-plug assist vacuum forming. Other thermoforming methods are also known.

After forming, the bottom web is typically chilled or cooled and the product to be packaged is inserted into the individual formed compartments. The lidstock material is then applied to the forming web, sealing the compartments. The lidstock material may be sealed to the upper perimeter of the individual compartments using an adhesive and/or by heat sealing. The thus formed serially connected packages are cut from the web and trimmed to the desired final shape. Secondary functions that are selectively integrated into the process include printing or decorating either before or after forming, embossing, notching, slotting, punching, labeling, counting and stacking.

FFS packaging technology is especially adaptable to packaging environmentally sensitive products such as disposable medical devices and certain types of food stuffs. In connection with packaging such materials, it is important that when the package is opened by peeling the lidstock from the forming web portion of the package, the integrity of the seal can be determined by visual inspection, confirming package sterility. Thus it is desirable that the portion of the lidstock seal area that is adhered to the forming web create a visible "frost" on the forming web when the package is opened by peeling the lidstock from the forming web. Preferably, the package is opened by applying a moderate constant force to peel the lidstock from the forming web without delamination, stringing or forming "angel hair" in the seal area in order to prevent contamination of the product and facilitate easy access inspection of the seal.

The ability to peel the lidstock film from the substrate bottom web through the application of a uniform relatively low peel force may be desirable in the case of individual or multiple serially connected packages. Preferably, the force required to separate the lidstock film from the substrate bottom web is in the range of about 0.25 to about 1.25 lbs./inch when tested in the manner hereinafter set forth. If excessive or non-uniform force is required to peel the film from the substrate, it is exceedingly difficult to open the individual packages and extract the packaged items in a controlled fashion either mechanically or manually.

A transparent lidstock or forming web is desired for some applications to allow visual inspection of the packaged product. Additionally, the lidstock preferably has sufficiently low adhesive properties to prevent the packaged articles from adhering to the film when the film is peeled from the substrate forming web.

In the case of certain products, it is also desirable to provide a lidstock with "pop through" properties. Thus, a product may be extracted from the package by flexing the package to punch the product through the lidstock material. Materials that exhibit high elongation properties typically do not allow the product to punch through. Rather such materials elongate and drape around the product when the package is flexed.

The pop through feature may be desirable in the case of relatively rigid products that must be packaged in a manner that facilitates rapid extraction of the product from the package as in the case of disposable medical devices. Preferably, such lidstock films evidence pop through properties such that elongation to puncture is less than about 1.5 inches when tested in the manner hereinafter described.

Some products also require sterilization. In recent years there has been a trend away from conventional sterilization techniques such as autoclaving or ethylene oxide treatment for sterilizing disposable equipment for hospital and medical use such as tubes, syringes, pipettes, vials and the like. Rather, sterilization with ionizing radiation such as electron beam or gamma radiation has evolved as a preferred method of sterilizing many types of disposable equipment for hospital and medical use. Ionizing radiation, however, can profoundly alter the molecular structure and macroscopic properties of polymeric materials such as polypropylene, polyethylene and propylene-ethylene copolymers. Exposure to ionizing radiation typically results in loss of physical properties, brittleness and discoloration. Consequently, materials used to package products that are subsequently sterilized with ionizing radiation, should be resistant to radiation induced.

Thus, there exists a need for films useable as lidstocks and forming webs in form, fill and seal applications to produce packages that may be opened with the application of moderate force to peel the lidstock from the forming web. Additionally, the physical properties of the lidstock film should be such that a rigid product can be punched through the film without excessive elongation of the film.

There also exists a need for a lid stock film that provides a frosty or visually traceable indicator of seal integrity when a package is opened by peeling the lidstock away from the forming web. In conjunction with the lidstock, there exists a need for a forming web heat sealable to the lidstock to provide a product package with desirable properties, such as resistance to radiation induced loss of physical properties, brittleness and discoloration.

SUMMARY OF THE INVENTION

The present invention includes a lidstock film adapted to form a peelable seal with a substrate upon heat sealing that incorporates desirable pop through properties, forms a frosty indicator of seal integrity and which is resistant to radiation induced changes in physical properties. The lidstock film comprises a first layer of high density polyethylene having a melt index of from about 0.1 to about 6.0, the layer comprising 5 to 50 wt % of the lidstock film. A second layer of ethylene vinyl acetate comprises from 20 to 80 wt % of said lidstock film; and a third seal is formed from a blend of from 20 to 80 wt % of a polyionomer and low density polyethylene, the third layer comprising from 20% to 80% of the lidstock film. The lidstock film has a thickness of from 1.5 mils to 5.0 mils.

The present invention also includes a coextruded forming web adapted to form a peelable seal with a lidstock upon heat sealing. The forming web comprises a first seal layer produced from a mixture of from 5 to 35 wt % of a rubber and ethylene vinyl acetate, the seal layer comprising from 5 to 35 wt % of the forming web. A second layer of the forming web is formed from a mixture of from 20 to 80 wt % of ethylene vinyl acetate and a linear low density polyethylene, the second layer comprising 20 to about 80 wt % of the forming web; and a third layer comprises linear low density polyethylene, the third layer comprising from about 20 to about 80 wt % of the forming web. The forming web has a thickness of from 2.0 mils to 15 mils and is heat sealable to the lidstock film at temperatures between 250° F. and 350° F. to form a peelable seal.

DETAILED DESCRIPTION OF THE INVENTION

Figure 1:
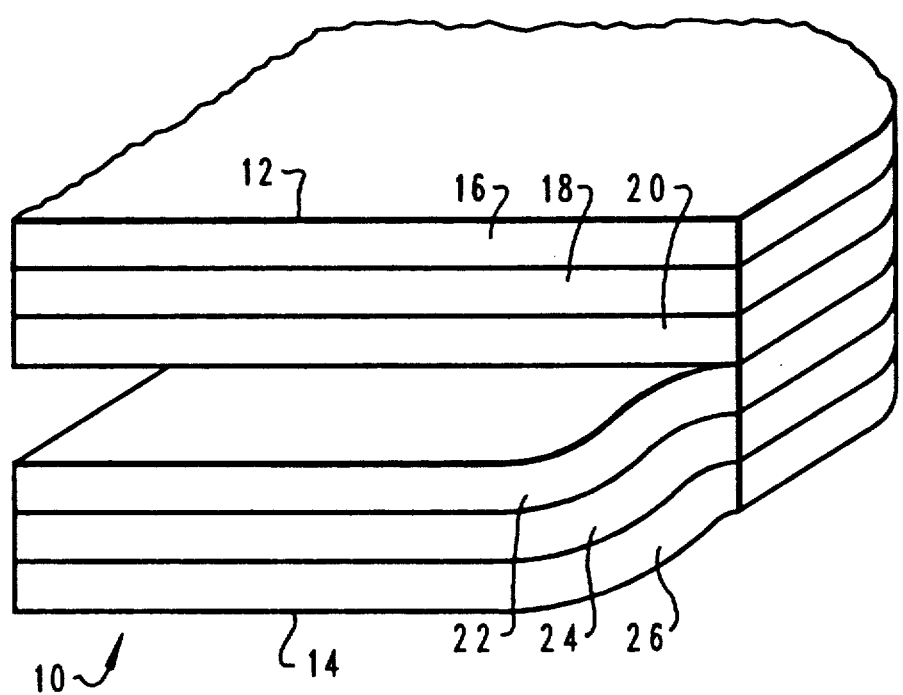
FIG. 1 is a partial cross section of a package formed from the films of the present invention.

Referring now to FIG. 1, a package 10 utilizing the lidstock film 12 and forming web 14 of the invention is illustrated in partial cross section. As illustrated, the lidstock film 12 comprises an exterior layer 16 of high density polyethylene (HDPE) having a melt index in the range of from about 0.1 to about 6.0, an upper intermediate layer 18 of ethylene vinyl acetate (EVA) containing about 12% vinyl acetate and an upper seal layer 20 comprising a mixture of from 20% to 80% of a polyionomer and low density polyethylene. The particular polyionomer used in the embodiment of FIG. 1 is a sodium neutralized methacrylic acid copolymer commercially available from E. I. du Pont de Nemours & Company, Wilmington Del. under the trade designation Surlyn 1601. In accordance with the present invention, exterior layer 16 comprises from 5% to 50% of lidstock film 12 and upper intermediate layer 18 and upper seal layer 20 each comprise from 20% to 80% of lidstock film 12. All percentages used herein are on weight basis unless other wise noted. Lidstock film 12 is produced in thickness ranging from about 1.5 to about 5 mils depending on the particular application and is suitable for heat sealing to various substrate materials at temperatures between about 250° F. and 350° F.

As illustrated, the forming web 14 includes a bottom seal layer 22 comprising a mixture of from about 5% to about 35% of a rubber such as polybutylene and an EVA having a vinyl acetate content of about 4.5%. In the embodiment illustrated in FIG. 1, the particular polybutylene is commercially available from Shell Chemical Co., Houston, Tex. under the trade designation 1600SA. A lower intermediate layer 24 is formed from a blend of from about 20% to 80% EVA and linear low density polyethylene (LLDPE). A lower exterior layer 26 is formed from a LLDPE. The particular LLDPE used in the embodiment illustrated in FIG. 1 is commercially available from Dow Chemical Co., Midland, Mich. under the trade designation 2045. Layer 22 comprises from 5% to 35% of the forming web 14 and lower intermediate layer 24 and lower exterior layer 26 each comprise from 20% to 80% of forming web 14. Forming web 14 has a thickness, depending on the application, from about 2.0 to about 15 mils. The forming web 14 is formable over a wide range of temperatures and draw ratios, depending on the specific application.

In addition to the foregoing, the lidstock film 12 and the forming web 14 of the present invention may contain various additives such as slip and antiblock agents, antioxidants, stabilizers, fillers and the like. The lidstock 12 and the forming web 14 may be produced by one of several conventional techniques, including conventional blown and cast film coextrusion techniques. The lidstock film 12 and the forming web 14 are heat sealable using convention equipment at temperatures ranging from about 250° F. to about 350° F. When the seal is separated, the sealed area of the lidstock acquires a "frosty" appearance, enabling a visual inspection to determine seal integrity. Packages produced from lidstock film 12 and forming web 14 are also resistant to radiation induced changes, provide desirable "pop through" characteristics and are resistant to failure from abrasion or the formation of pin holes. The following examples illustrate the desirable properties of the lidstock film and forming web of the present invention.

EXAMPLE 1

Lidstock and forming web films in accordance with the present invention were produced using conventional blown film coextrusion techniques. The compositions and percentages of the different layers of the films are set forth in Table 1 below. The layer numbers identified in Table 1 correspond to layer numbers of FIG. 1.

TABLE 1

| LAYER | SUPPLIER | MATERIAL TYPE | MATERIAL NUMBER | % OF LAYER | % OF TOTAL | MELT INDEX | DENSITY |
|---|---|---|---|---|---|---|---|
| | | | LIDSTOCK No.1 | | | | |
| 16 | QUANTUM | HDPE | HD6180 | 100.0% | 25.0% | 1.20 | 0.960 |
| 18 | QUANTUM | 12% EVA | UE657 | 88.0% | 44.0% | 0.50 | 0.940 |
| | QUANTUM | WHITE MB | CM88200 | 12.0% | 6.0% | 8.00 | 1.490 |
| 20 | REXENE | LDPE | 1058 | 70.0% | 17.5% | 5.50 | 0.922 |
| | DUPONT | SURLYN | 1601 | 30.0% | 1.5% | 1.30 | 0.938 |
| | | | LIDSTOCK No. 2 | | | | |
| 16 | OXYCHEM | HDPE | 7812 | 100.0% | 25.0% | 0.27 | 0.944 |
| 18 | QUANTUM | 12% EVA | UE657 | 76.0% | 19.0% | 0.50 | 0.940 |
| | QUANTUM | WHITE MB | CM88200 | 24.0% | 6.0% | 8.00 | 1.490 |
| 20 | REXENE | LDPE | 1058 | 70.0% | 35.0% | 5.50 | 0.922 |
| | DUPONT | SURLYN | 1601 | 30.0% | 15.0% | 1.30 | 0.938 |
| | | | FORMING WEB | | | | |
| 22 | SHELL | POLYBUTYLENE | 1600SA | 25.0% | 5.0% | 0.70 | 0.910 |

TABLE 1-continued

| LAYER | SUPPLIER | MATERIAL TYPE | MATERIAL NUMBER | % OF LAYER | % OF TOTAL | MELT INDEX | DENSITY |
|---|---|---|---|---|---|---|---|
|  | QUANTUM | 4.5% EVA | NA480 | 75.0% | 15.0% | 0.25 | 0.926 |
| 24 | QUANTUM | SLIP MB | CM11126 | 5.0% | 2.0% | 5.00 | 0.922 |
|  | QUANTUM | 12% EVA | UE657 | 22.5% | 9.0% | 0.50 | 0.940 |
|  | DOW | LLDPE | 2045 | 72.5 | 29.0% | 1.00 | 0.922 |
| 26 | DOW | LLDPE | 2045 | 100.0% | 40.0% | 1.00 | 0.922 |

In order to determine the suitability of the lidstock and bottom web films of the present invention for applications where radiation sterilization is desirable, to radiation induced changes in physical properties, the forming web and lidstock films were irradiated with gamma and electron beam ionizing radiation and aged. The physical properties of the films were tested according to standard ASTM test procedures. In addition to the standard ASTM tests, samples of the lidstock film were tested for "pop through" properties in accordance with the following procedure.

A four inch square sample of the lidstock film was clamped in an Instron tensile test machine in the transverse direction. A semicircular probe designed to simulate a syringe flange having a ⅜ inch radius and a width of ¼ inch was clamped in the machine jaw and the jaw speed was set at 50 inches per minute. The Instron machine was started and the probe allowed to puncture the film. The force (lbs/inch) and energy (ft/lbs) required to puncture the film was measured with a chart recorder. Film elongation to puncture was also recorded. The test was also repeated with the film clamped in the longitudinal direction. Results of the "pop through" test, along with the results of standard ASTM tests are set forth in Table 2 below:

TABLE 2

| LIDSTOCK FILM No. 1 | | | | | | |
|---|---|---|---|---|---|---|
| Radiation Type:<br>Dosage:<br>Aged: | None | E-Beam<br>8 MRad<br>1 Wk | E-Beam<br>8 MRad<br>4 Mnths | N/S | Gamma<br>4 MRad<br>1 Wk | Gamma<br>4 MRad<br>4 Mnths |
| GAUGE | 2.5 | 2.5 | 2.5 | 2.5 | 2.5 | 2.5 |
| TENSILE | | | | | | |
| Ultimate (psi) | | | | | | |
| MD | 3140 | 4255 | 3845 | 3140 | 3080 | 3225 |
| TD | 2155 | 2855 | 2885 | 2155 | 2155 | 2065 |
| Elongation (%) | | | | | | |
| MD | 490 | 525 | 470 | 490 | 530 | 450 |
| TD | 650 | 630 | 550 | 650 | 675 | 530 |
| Secant Modulus (psi) | | | | | | |
| MD | 42160 | 42015 | | 42160 | 44875 | |
| TD | 49230 | 48260 | | 49230 | 51790 | |
| Tear (grams/mil) | | | | | | |
| MD | 33 | 61 | | 33 | 37 | |
| TD | 131 | 128 | | 131 | 137 | |
| Spencer Impact (millijoules) | 801 | 774 | | 801 | 640 | |
| POP-THRU | | | | | | |
| MD | | | | | | |
| Force (lbs/in) | 8.20 | 7.63 | | 8.20 | 5.49 | |
| Elongation (in) | 1.08 | 1.42 | | 1.08 | 0.93 | |
| Energy (ft/lbs) | 0.11 | 0.48 | | 0.11 | 0.20 | |
| TD | | | | | | |
| Force (lbs/in) | 6.77 | 7.58 | | 6.77 | 6.63 | |
| Elongation (in) | 1.36 | 1.24 | | 1.36 | 1.12 | |
| Energy (ft/lbs) | 0.13 | 0.40 | | 0.13 | 0.32 | |
| LIDSTOCK FILM No. 2 | | | | | | |
| Radiation Type:<br>Dosage:<br>Aged: | None | E-Beam<br>8 MRad<br>1 Wk | E-Beam<br>8 MRad<br>4 Mnths | N/S | Cobalt<br>4 MRad<br>1 Wk | Cobalt<br>4 MRad<br>4 Mnths |
| GAUGE | 3.00 | 3.00 | 2.50 | 3.00 | 3.00 | 2.50 |
| TENSILE | | | | | | |
| Ultimate (psi) | | | | | | |
| MD | 3300 | 3870 | 4545 | 3300 | 3325 | 3615 |
| TD | 1740 | 2290 | 2690 | 1740 | 1795 | 1975 |
| Elongation (%) | | | | | | |
| MD | 495 | 495 | 485 | 495 | 500 | 460 |
| TD | 695 | 475 | 515 | 695 | 455 | 515 |
| Secant Modulus (psi) | | | | | | |
| MD | 34495 | 38105 | 39540 | 34495 | 37920 | 40550 |
| TD | 41050 | 43535 | 45805 | 41050 | 43085 | 47535 |
| Tear (grams/mil) | | | | | | |
| MD | 22 | 35 | 27 | 22 | 24 | 20 |
| TD | 104 | 93 | 88 | 104 | 103 | 91 |
| Spencer Impact (millijoules) | 807 | 1198 | 911 | 807 | 789 | 693 |
| POP-THRU | | | | | | |

TABLE 2-continued

| MD | | | | | | |
|---|---|---|---|---|---|---|
| Force (lbs/in) | 6.10 | 8.75 | 7.34 | 6.10 | 5.30 | 5.27 |
| Elongation (in) | 0.91 | 1.29 | 1.22 | 0.91 | 0.66 | 0.67 |
| Energy (ft/lbs) | 0.06 | 0.50 | 0.42 | 0.06 | 0.10 | 0.12 |
| TD | | | | | | |
| Force (lbs/in) | 7.88 | 9.00 | 8.14 | 7.88 | 7.58 | 6.95 |
| Elongation (in) | 1.19 | 1.23 | 1.20 | 1.19 | 0.96 | 1.00 |
| Energy (ft/lbs) | 0.12 | 0.48 | 0.44 | 0.12 | 0.29 | 0.30 |

FORMING WEB (5.5 mil)

| Radiation type: | None | Gamma | Gamma |
|---|---|---|---|
| Dosage | | 4 Mrads | 4 Mrads |
| Aged: | | | 4 Months |
| Tensile MD | 4100 | 3620 | 3780 |
| Tensile TD | 4000 | 3320 | 3590 |
| Elongation MD | 670 | 680 | 670 |
| Elongation TD | 740 | 750 | 740 |
| MD Secant | 23000 | 23000 | 27000 |
| Tear MD | 2400 | 2330 | 2200 |
| Tear TD | 2600 | 2760 | 2660 |
| Spencer Impact | 2000 | 1820 | 1600 |
| Radiation type: | None | E-Beam | E-Beam |
| Dosage: | | 8 Mrads | 8 Mrads |
| Aged: | | | 4 Months |
| Tensile MD | 4100 | 4560 | 4470 |
| Tensile TD | 4000 | 4690 | 4330 |
| Elongation MD | 670 | 640 | 650 |
| Elongation TD | 740 | 690 | 690 |
| MD Secant | 23000 | 21500 | 27000 |
| Tear MD | 2400 | 2480 | 2430 |
| Tear TD | 2600 | 2680 | 2760 |
| Spencer Impact | 2000 | 4500 | 4320 |

The foregoing test results indicate that the lidstock film of the present provides desirable pop through properties as evidenced by punch through of the test probe at elongation values less than about 1.5 inches when tested in accordance with the procedure set forth above. The test results also indicate that the lidstock film and forming web of the present invention are very adaptable to applications requiring sterilization with radiation as evidenced by resistance to radiation induced changes in physical properties.

EXAMPLE 2

Individual test samples were prepared by heat sealing samples of lidstock films and forming webs produced in accordance with the present invention. A modified Sentinel heat sealer, Model No. 12A, with a 1" inch-wide heated top jaw and a 1" silicone rubber bottom jaw was used to seal the lidstock and forming web. The temperature of the top jaw of the heat sealer was set and maintained at approximately 300° Fahrenheit. The jaw pressure was set at approximately 40 PSI the sealer jaws were set to remain closed for a period of about one second. Prior to sealing the materials, the sealer was brought up to temperature with the jaws closed. The layered materials were then heat sealed by opening the jaws of the sealer, placing the lidstock and forming web samples between the jaws of the sealer and closing the jaws of the heat sealer for a period of one second. After the materials had been heat sealed, test strips having a one inch square seal area were cut from the materials and the seal strength was tested in both the machine and transverse direction.

The peel strength of the seal formed between the lidstock film and the forming web was then determined, using an Instron Model 1130 test machine. The jaws of the Instron machine were set at a gauge length of approximately 2". The unsealed portion of the test strip was separated and the ends of the lidstock film and forming web placed in the Instron machine's jaws. The jaws of the Instron machine were set to separate at a rate of 12 inches per minute. The force required to separate the lidstock film from the forming web was measured and recorded using a chart recorder. Test results were averaged and are set forth in Table 3 below:

TABLE 3

| Sample No. | Sample Gauge | Average Peel Strength lbs/inch |
|---|---|---|
| 1 | 6 mil | 1.03 |
| 2 | 4.5 mil | 0.72 |
| 3 | 3.0 mil | 0.47 |
| 4 | 3.0 mil | 0.41 |

As is apparent from the foregoing, samples prepared from the lidstock film and forming web exhibited peel strengths within the desired range of from between 0.25 and 1.5 lbs/inch when tested in the foregoing manner. Additionally, the seal area after separation exhibits the desired frosty appearance.

While the particular embodiments of the present invention have been described, it will be apparent to those skilled in the art that various changes and modifications can be made without departing from the spirit and scope of the invention. The following claims are intended to cover all such modifications that are within the scope of this invention.

We claim:

1. A lidstock film adapted to form a peelable seal with a substrate upon heat sealing, the lidstock film comprising:
   a first layer of high density polyethylene having a melt index of from 0.1 to 6.0;
   a second layer of ethylene vinyl acetate;

a third layer formed from a blend of from 20% to 80% of a polyionomer and a low density polyethylene; and said first, second and third layers being formed into a lidstock film having a thickness of from 1.5 mils to 5.0 mils and being heat sealable with a substrate at temperatures between 250° F. and 350° F. to form a peelable seal with the substrate.

2. The lidstock film of claim 1 wherein said polyionomer is a sodium neutralized methacrylic acid copolymer having a melt index of from about 0.5 to about 2 and a density of from about 0.930 g/cm³ to about 0.940 g/cm³.

3. The lidstock film of claim 1 wherein the ethylene vinyl acetate contains from about 8% to about 18% vinyl acetate.

4. The lidstock film of claim 1 wherein said lidstock film exhibits punch through at less than 1.5 inches elongation.

5. The lidstock film of claim 1 wherein separation of said film from a selected substrate after heat sealing to form a seal area creates a visible indication of the seal area.

6. A forming web adapted to form a peelable seal with a lidstock upon heat sealing, said forming web comprising:
a first seal layer comprising a mixture of from 5% to 35% of a rubber and ethylene vinyl acetate, said first seal layer comprising from 5% to 35% of said forming web;
a second layer comprising a mixture of from 20% to 80% of ethylene vinyl acetate and a linear low density polyethylene, said second layer comprising from 20% to 80% of said forming web;
a third layer comprising linear low density polyethylene, said third layer comprising from about 20% to about 80% of said forming web; and
said first, second and third layers comprising a forming web having a thickness of from 2.0 mils to 15 mils and being heat sealable at temperatures between 250° F. and 350° F. to form a peelable seal with the lidstock.

7. The forming web of claim 6 wherein said rubber is polybutylene having a melt index of from about 0.2 to about 2.0.

8. The forming web of claim 6 wherein the ethylene vinyl acetate in said first layer contains from about 2% to about 8% vinyl acetate.

9. The forming web of claim 6 wherein the ethylene vinyl acetate in said second layer contains from about 8% to about 18% vinyl acetate.

10. The forming web of claim 6 wherein said linear low density polyethylene has a melt index of from about 0.5 to about 5.0 and a density of from about 0.910 g/cm³ to about 0.930 g/cm³.

11. A package, including a seal area, formed from:
(1) a lidstock film adapted to form a peelable seal with a substrate upon heat sealing, the lidstock film comprising:
a first layer of high density polyethylene having a melt index of from 0.1 to 6.0, said first layer comprising 5% to 50% of said lidstock film;
a second layer of ethylene vinyl acetate, said second layer comprising from 20% to 80% of said lidstock film;
a third seal layer formed from a blend of from 20% to 80% of polyionomer and a low density polyethylene, said third layer comprising from 20% to 80% of said lidstock film; and (2) a forming web adapted to form a peelable seal with said lidstock film upon heat sealing, said forming web comprising:
a first seal layer comprising a mixture of from 5% to 35% of a rubber and ethylene vinyl acetate, said first seal layer comprising from 5% to 35% of said forming web;
a second layer comprising a mixture of from 20% to 80% of ethylene vinyl acetate and a linear low density polyethylene, said second layer comprising from 20% to 80% of said forming web;
a third layer comprising linear low density polyethylene, said third layer comprising from about 20% to about 80% of said forming web; and
said lidstock film having a thickness of from 0.5 mils to 2.0 mils;
said forming web having a thickness of from 2.0 mils to 15 mils;
said lidstock film and said forming web being heat sealable at temperatures between 250° F. and 350° F. to form a seal area.

12. The package of claim 11 wherein said polyionomer is a sodium neutralized methacrylic acid copolymer having a melt index of from about 0.5 to about 2 and a density of from about 0.930 g/cm³ to about 0.940 g/cm³.

13. The package of claim 11 wherein said lidstock film exhibits punch through at less than 1.5 inches elongation.

14. The package of claim 11 wherein separation of said film from said forming web after heat sealing to form a seal area creates a visible indication of the seal area.

15. The package of claim 11 wherein the peal strength of said seal area is from about 0.25 lbs/inch to about 1.5 lbs/inch.

16. The lidstock film of claim 1 the peal strength of said peelable seal is from about 0.25 lbs/inch to about 1.5 lbs/inch.

17. The lidstock film of claim 1 wherein said lidstock is heat sealed to a substrate, the substrate comprising:
a first layer comprising a mixture of from 5% to 35% of a rubber and ethylene vinyl acetate;
a second layer comprising a mixture of from 20% to 80% of ethylene vinyl acetate and a linear low density polyethylene;
a third layer comprising linear low density polyethylene.

18. The lidstock film of claim 17 wherein said polyionomer is a sodium neutralized methacrylic acid copolymer having a melt index of from about 0.5 to about 2 and a density of from about 0.930 g/cm³ to about 0.940 g/cm³.

19. The lidstock film of claim 17 wherein the ethylene vinyl acetate contains from about 8% to about 18% vinyl acetate.

20. The lidstock film of claim 17 wherein said lidstock film exhibits punch through at less than 1.5 inches elongation.

21. The lidstock film of claim 1 wherein separation of said film from the substrate after heat sealing to form a seal area creates a visible indication of the seal area.

22. The lidstock film of claim 17 wherein the force required to separate the lidstock film from the substrate after heat sealing is from about 0.25 lbs/inch to about 1.5 lbs/inch.

* * * * *

UNITED STATES PATENT AND TRADEMARK OFFICE
CERTIFICATE OF CORRECTION

PATENT NO. : 5,324,555
DATED : June 28, 1994
INVENTOR(S) : Jeffrey S. Hughart; Joel D. Finnell It is certified that error appears in the above-indentified patent and that said Letters Patent is hereby corrected as shown below:

Column 3, line 2, "seal is formed" should be --seal layer is formed--.

Column 7, line 52, "PSI the sealer" should be --PSI and the sealer--.

Signed and Sealed this

Sixteenth Day of May, 1995

Attest:

BRUCE LEHMAN

Attesting Officer

Commissioner of Patents and Trademarks